Figure 1:
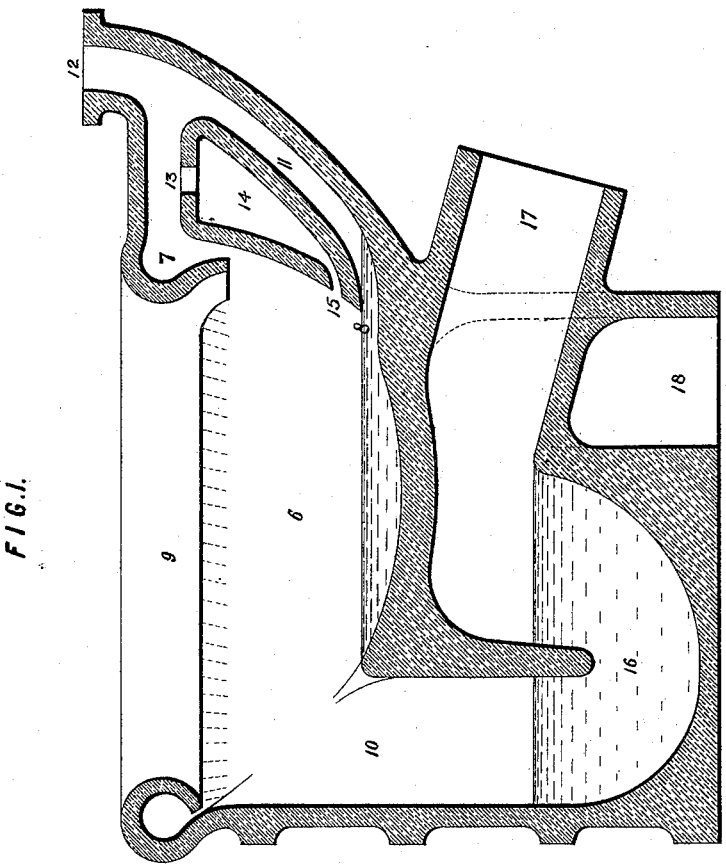

(No Model.)

J. SHANKS.
WATER CLOSET BASIN.

No. 396,959. Patented Jan. 29, 1889.

WITNESSES,

INVENTOR.
John Shanks
By his Attorneys
Howson and Howson

UNITED STATES PATENT OFFICE.

JOHN SHANKS, OF BARRHEAD, COUNTY OF RENFREW, SCOTLAND.

WATER-CLOSET BASIN.

SPECIFICATION forming part of Letters Patent No. 396,959, dated January 29, 1889.

Application filed May 15, 1888. Serial No. 273,977. (No model.) Patented in England December 12, 1885, No. 15,255.

*To all whom it may concern:*

Be it known that I, JOHN SHANKS, a subject of the Queen of Great Britain and Ireland, and a resident of Barrhead, in the county of Renfrew, Scotland, have invented certain Improvements in Water-Closet Basins, (for which I have obtained British Patent, dated December 12, 1885, No. 15,255,) of which the following is a specification.

My said invention has for its object to improve the construction and action of water-closets made with basins of the "wash-out" kind.

In carrying out my invention the basin is made with two distinct water-inlets. One inlet is at the top of the basin and communicates with a hollow rim to distribute the water, and the other inlet is in a lower position facing the main discharge-outlet from the basin. In addition, there is a third water-inlet of small size from a pocket or small compartment made with an opening at the top to receive water from the main flushing-stream and to deliver it into the basin slowly, so as to act as an after-service for filling the bottom of the basin. The basin is by preference to be placed with its main discharge-outlet at the front side, this outlet leading down to a trap-bend formed immediately beneath the basin.

An explanatory drawing is hereunto appended, showing in vertical section a water-closet basin as made with my improvements.

My improved water-closet basin 6 is of what is known as the "wash-out" kind, and is made with two distinct inlets, 7 8, for the main supply of flushing-water, which is supplied by a pipe (not shown) connected to the horn 12. One, 7, of the water-inlets is in the common position at the top of the basin 6, and is in communication with a hollow rim, 9, arranged to distribute the water round the basin, and made with one or more slits at its bottom for that purpose. The other water-inlet, 8, is in a lower position at the level of the water which is retained in the bottom of the basin, and it faces the main discharge-outlet 10, so that the force of the jet entering by it is well directed for sweeping the contents of the basin 6 into the discharge-outlet; and to give the fullest action to the jet the pipe or passage 11, leading to this lower inlet, 8, is, with the horn 12, made a direct continuation of the main water-supply pipe, the upper inlet, 7, being supplied by a branch, 13, therefrom. The inlets 7 8, with the passages 13 11 leading to them, are made in the same piece with the basin 6, so that there is only a single joint connecting them to the main water-supply pipe. This improved arrangement of the basin-inlets 7 8 has combined with it a simple device for supplying a little water as an after-service to insure the filling of the bottom of the basin. This device consists of a pocket or small compartment, 14, having an opening at the top to receive water from the upper inlet branch passage, 13, while there is at the bottom of the pocket a small orifice, 15, leading into the basin. The pocket 14 becomes more or less filled while the main flushing-stream is being delivered; but it empties itself slowly because of the smallness of the bottom orifice, 15, so that enough remains for the intended purpose after the main supply has ended. A trap-bend passage, 16, is formed beneath the basin 6, no part of the discharge-outlet 10 or of the basin proper forming any part of the trap. The drain-pipe (not shown) may be connected at 17 at the back of the basin-piece; or the basin-piece may be modified in form, as indicated by dotted lines, so that the drain-pipe may be connected at 18 at the bottom.

What I claim as my invention is—

A water-closet basin having combined in it a main discharge-outlet at the side leading down into a trap-bend passage below the basin, a concave basin-bottom dipping a little lower than the bottom edge of the main outlet, an upper water-flushing inlet, a hollow slit distributing-rim, a lower water-flushing inlet facing the main discharge-outlet and at the level of the water retained in the basin-bottom, a passage leading to the lower flushing-inlet directly from the horn to which the water-supply pipe is connected, and an after-service pocket with a top opening to receive water from the flushing-stream and with a small bottom orifice or inlet into the basin, the said several parts being all made in one piece, and substantially as herein set forth.

In testimony whereof I have signed my name to this specification in the presence of two subscribing witnesses.

JOHN SHANKS.

Witnesses:
EDMUND HUNT,
DAVID FERGUSON.